(12) United States Patent
Kortelainen et al.

(10) Patent No.: US 10,407,149 B2
(45) Date of Patent: Sep. 10, 2019

(54) SEAL ARRANGEMENT IN A VESSEL

(71) Applicant: ABB Oy, Helsinki (FI)

(72) Inventors: Ville Kortelainen, Helsinki (FI); Erkki Ronkainen, Vantaa (FI); Jussi Kiiskilä, Helsinki (FI)

(73) Assignee: ABB OY, Helsinki (FI)

(*) Notice: Subject to any disclaimer, the term of this patent is extended or adjusted under 35 U.S.C. 154(b) by 822 days.

(21) Appl. No.: 14/839,959

(22) Filed: Aug. 29, 2015

(65) Prior Publication Data
US 2016/0059950 A1 Mar. 3, 2016

(30) Foreign Application Priority Data

Sep. 2, 2014 (EP) .................................. 14183127

(51) Int. Cl.
F16J 15/46 (2006.01)
B63H 23/32 (2006.01)
(Continued)

(52) U.S. Cl.
CPC .......... B63H 23/321 (2013.01); B63H 5/125 (2013.01); F16J 15/008 (2013.01);
(Continued)

(58) Field of Classification Search
CPC .............. F16J 15/32; F16J 15/00; F16J 15/40
See application file for complete search history.

(56) References Cited

U.S. PATENT DOCUMENTS 3,413,008 A * 11/1968 Greiner .................. B63H 23/36
                                                     277/505
3,773,336 A * 11/1973 Walter .................... B63H 23/36
                                                     277/551
(Continued)

FOREIGN PATENT DOCUMENTS

DE 102009000994 A1 8/2010
GB 1381051 A 1/1975
(Continued)

OTHER PUBLICATIONS

IP Australia, Patent Examination Report, 2015205928, dated Nov. 13, 2015, 5 pages.
European Patent Office, European Search Report issued in European Patent Application No. 14183127 dated Feb. 17, 2015, 2 pp.
Office Action for Japanese Application No. 2015170376, dated Jul. 12, 2016, 4 pages. (English Translation Included).
(Continued)

Primary Examiner — Vishal A Patel
(74) Attorney, Agent, or Firm — Taft Stettinius & Hollister LLP; J. Bruce Schelkopf

(57) ABSTRACT

The arrangement comprises a seal (500) sealing a cylindrical rotating part (100) passing through an opening in a support structure in the vessel (10) against a medium (W). The seal (500) comprises a package of annular seal rings (510, 520, 530). Each seal ring (510, 520, 530) comprises a seal part (512, 522, 532) being supported in a corresponding seal support part (511, 521, 531). The seal support part (511) in the first seal ring (510) positioned closest to the medium (W) has the form of a cylinder (511A) provided with an annular flange (511B) at one end of the cylinder (511A). The outer surface of the cylinder (511A) is supported and sealed with an auxiliary seal (610) against the inner circumference of the opening. The annular flange (511B) is supported against the support structure (83) surrounding the opening. There are adjusting means (900) for adjusting the position of the first seal support part (511) in relation to the support structure (83) surrounding the opening in order to relocate the seal (500) in an axial direction in relation to the rotating part (31, 100).

13 Claims, 8 Drawing Sheets

(51) Int. Cl.
  *F16J 15/3268* (2016.01)
  *B63H 5/125* (2006.01)
  *F16J 15/00* (2006.01)

(52) U.S. Cl.
  CPC ........... *F16J 15/3268* (2013.01); *F16J 15/46* (2013.01); *B63H 2005/1258* (2013.01); *B63H 2023/327* (2013.01)

(56) References Cited

U.S. PATENT DOCUMENTS

| | | | | |
|---|---|---|---|---|
| 3,847,453 | A * | 11/1974 | Herbert | F16J 15/3268 277/562 |
| 3,866,813 | A * | 2/1975 | Arnold | F16J 15/3268 277/551 |
| 3,902,726 | A * | 9/1975 | Hisada | B63H 23/321 277/563 |
| 5,152,704 | A * | 10/1992 | Carlson | B63H 11/08 277/562 |
| 5,813,676 | A | 9/1998 | Antonini et al. | |
| 5,820,132 | A * | 10/1998 | Marnot | F16J 15/008 277/551 |
| 2010/0014791 | A1 * | 1/2010 | Versteegh | F16C 19/184 384/147 |
| 2011/0012314 | A1 * | 1/2011 | Nakamura | F16J 15/008 277/562 |
| 2012/0098209 | A1 | 4/2012 | Siegfriedsen | |

FOREIGN PATENT DOCUMENTS

| | | |
|---|---|---|
| JP | 02029893 U | 2/1990 |
| JP | 07015500 U | 3/1995 |
| JP | 2002234493 A | 8/2002 |
| JP | 2008001208 A | 1/2008 |
| WO | 2011004456 A1 | 1/2011 |

OTHER PUBLICATIONS

Office Action for Korean Application No. 10-2015-0116409, dated Apr. 7, 2017, 6 pages. (English Translation Included).

* cited by examiner

Prior Art

SEAL ARRANGEMENT IN A VESSEL

FIELD OF THE INVENTION

The present invention relates to a seal arrangement in a vessel according to the preamble of claim 1.

BACKGROUND ART

A vessel comprises different rotating parts that pass through openings in the vessel or in equipment relating to the vessel and that must be sealed against a medium e.g. sea water or oil etc. in said opening.

A vessel provided with a propulsion unit comprises at least two positions where a rotating part passing through an opening must be sealed against a medium. A propulsion unit comprises a hollow strut with an upper portion and a lower portion. The upper portion of the strut forms a support arm supporting the lower portion of the strut.

The upper portion of the strut of the propulsion unit is connected to an upper block. The upper block passes through a first opening formed in a bottom of a vessel from a first outer bottom to a second inner bottom of the vessel. The upper block is rotatably attached with a slewing bearing to the hull of the vessel. The upper block has normally a generally cylindrical from. The upper block could instead of being a separate part be formed by an upper end portion of the upper portion of the strut. A slewing seal positioned under the slewing bearing forms the seal between sea water and the interior of the hull of the vessel and between the oil of the slewing bearing and the sea water. This is the first position where a rotating part i.e. the upper block is sealed in the first opening against sea water.

The lower portion of the strut forms a longitudinal compartment comprising a first electric motor connected with a first shaft to a propeller positioned outside the lower portion of the strut. The first shaft is rotatably supported with bearings within the lower portion of the strut. The first shaft passes through a second opening in an end wall at an aft end of the lower portion of the strut and is sealed with a seal against sea water in the second opening. The seal prevents also oil from the shaft bearing from penetrating into the sea water. This is the second position where a rotating part i.e. the first shaft is sealed in the second opening against a medium.

There is a need to relocate the slewing seal and the shaft seal from time to time. The time interval for the relocation might be different for the slewing seal and the shaft seal. This is due to the wear of the liner on the outer surface of the rotating part at the points where the lip portions of the seal parts in the seal rings act. The lip parts of the seal parts in the seal rings will again act on a fresh surface of the liner after the axial relocation of the seal.

BRIEF DESCRIPTION OF THE INVENTION

An object of the present invention is to achieve an improved seal arrangement for a vessel.

The seal arrangement for a vessel according to the invention is characterized by what is stated in the characterizing portion of claim 1.

The seal arrangement comprises a seal sealing a cylindrical rotating part passing through an opening in a support structure in the vessel against a medium, said seal comprising a package of annular seal rings, each seal ring comprising a seal part being supported in a corresponding seal support part.

The arrangement is characterized in that the seal support part in the is first seal ring positioned closest to the medium has the form of a cylinder provided with an annular flange at one end of the cylinder, whereby an outer circumference of the cylinder is supported and sealed with an auxiliary seal against the inner circumference of the opening and the annular flange is supported against the support structure surrounding the opening. There are further adjusting means for adjusting the position of the first seal support part in relation to the support structure surrounding the opening in order to relocate the seal in an axial direction in relation to the rotating part.

The seal can thus be moved in an axial direction in relation to the rotating part so that the cylinder of the seal support part of the first seal ring glides in the opening. The relocation of the seal will relocate the position of the lip parts of the seal parts in the seal rings so that they act on a fresh surface of the rotating part.

The adjusting means comprises in one embodiment spacer rings that are inserted between the annular flange of the seal support part of the first seal ring and the support structure surrounding the opening. The spacer rings will relocate the seal in an axial direction in relation to the rotating part.

The adjusting means comprises in another embodiment adjuster bolts passing through the annular flange of the seal support part of the first seal ring to the support structure surrounding the opening. The adjuster bolts will relocate the water seal in an axial direction in relation to the rotating part.

The outer circumference of the cylinder of the seal support part in the first seal ring is sealed against the inner circumference of the opening. The seals in the cylinder of the seal support part in the first seal ring will prevent the medium from penetrating into the space where the spacer rings or the adjuster bolts are. There is thus no need for any seals in connection with the spacer rings or the adjuster bolts.

BRIEF DESCRIPTION OF THE DRAWINGS

In the following the invention will be described in greater detail by means of preferred embodiments with reference to the attached drawings, in which.

DETAILED DESCRIPTION OF THE INVENTION

Figure 1:
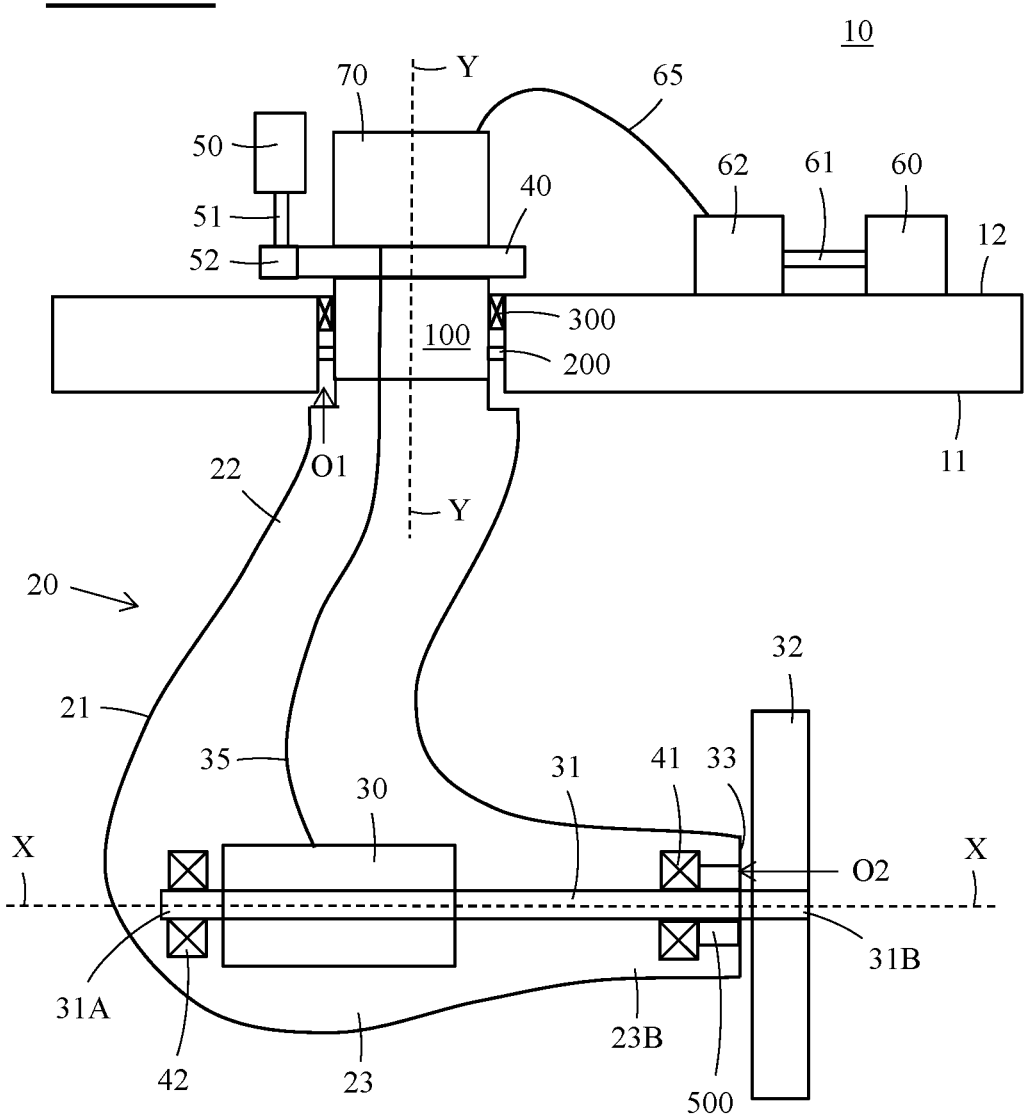
FIG. 1 shows a vertical cross section of a propulsion unit in a vessel.

FIG. 1 shows a vertical cross section of a propulsion unit in a vessel. The vessel 10 has a double bottom i.e. a first outer bottom 11 forming the hull of the vessel and a second inner bottom 12. The propulsion 20 unit comprises a hollow strut 21 with an upper portion 22 and a lower portion 23. The upper portion 22 of the strut 21 forms a support arm supporting the lower portion 23 of the strut.

The upper portion 22 of the strut 21 of the propulsion unit 20 is connected to an upper block 100. The upper block 100 passes through a first opening O1 formed in the bottom of the vessel 10. The first opening O1 extends between the first outer bottom 11 and the second inner bottom 12 of the vessel 10. The upper block 100 is rotatably attached with a slewing bearing 300 to the hull of the vessel 10. The upper block 100 has normally a generally cylindrical from. The upper block 100 could instead of being a separate entity as is shown here be formed as an integral portion of the upper portion 22 of the strut 21. The upper block 100 would thus form an upper end portion of the upper portion 22 of the strut 21. A slewing seal 200 positioned under the slewing bearing 300 prevents oil leakage from the slewing bearing 300 to the sea and sea water from penetrating into the interior of the hull of the vessel 10 through the passage between the rotating upper block 100 and the inner circumference of the first opening O1.

The lower portion 23 of the strut 21 forms a longitudinal compartment comprising a first electric motor 30 and a first shaft 31. A first end 31A of the first shaft 31 is connected to the first electric motor 30 and a second end 31B of the first shaft 31 passes through a second opening O2 in an end wall 33 at an aft end 23B of the lower portion 23 of the strut 21. A propeller 32 is connected to the second outer end 31B of the first shaft 31. The axial centre line X-X of the first shaft 31 forms a shaft line. The first shaft 31 is rotatably attached with bearings 41, 42 within the lower portion 23 of the strut 21. The second end 31B of the first shaft 31 is sealed with a water seal 500 in the second opening O2 in the end wall 33 through which the first shaft 31 passes out from the lower portion 23 of the strut 21.

A gearwheel 40 positioned within the vessel is further attached to the upper block 100. The gearwheel 40 can be turned 360 degrees around the centre axis Y-Y of rotation with a second electric motor 50. A second electric motor 50 drives a pinion wheel 52 through a second shaft 51. The cogs of the pinion wheel 52 are connected to the cogs of the gearwheel 40. There can naturally be several similar second electric motors 50 connected to the gearwheel 40. The turning of the gearwheel 40 will turn the propulsion unit 20. The gearwheel 40 has a ring form with a hole in the middle. The cogs of the gearwheel 40 are in this embodiment positioned on the outer edge of the gearwheel 40. The other possibility is to have the cogs on the inner edge of the gearwheel 40.

There is further an engine 60 within the vessel 10 and a generator 62 connected with a third shaft 61 to the engine 60. The engine 60 can be a conventional combustion engine used in vessels 10. The generator 62 produces electric energy needed in the vessel 10 and the propulsion unit 20. There can be several combustion engines 60 and generators 62 in a vessel 10.

There is further a slip ring arrangement 70 within the vessel in connection with the gearwheel 40. Electric power is transferred from the generator 62 to the slip ring arrangement 70 with a first cable 65. Electric power is further transferred from the slip ring arrangement 70 to the first electric motor 30 with a second cable 35. The slip ring arrangement 70 is needed in order to transfer electric power between the stationary hull 10 of the vessel and the rotating propulsion unit 20.

Figure 2:
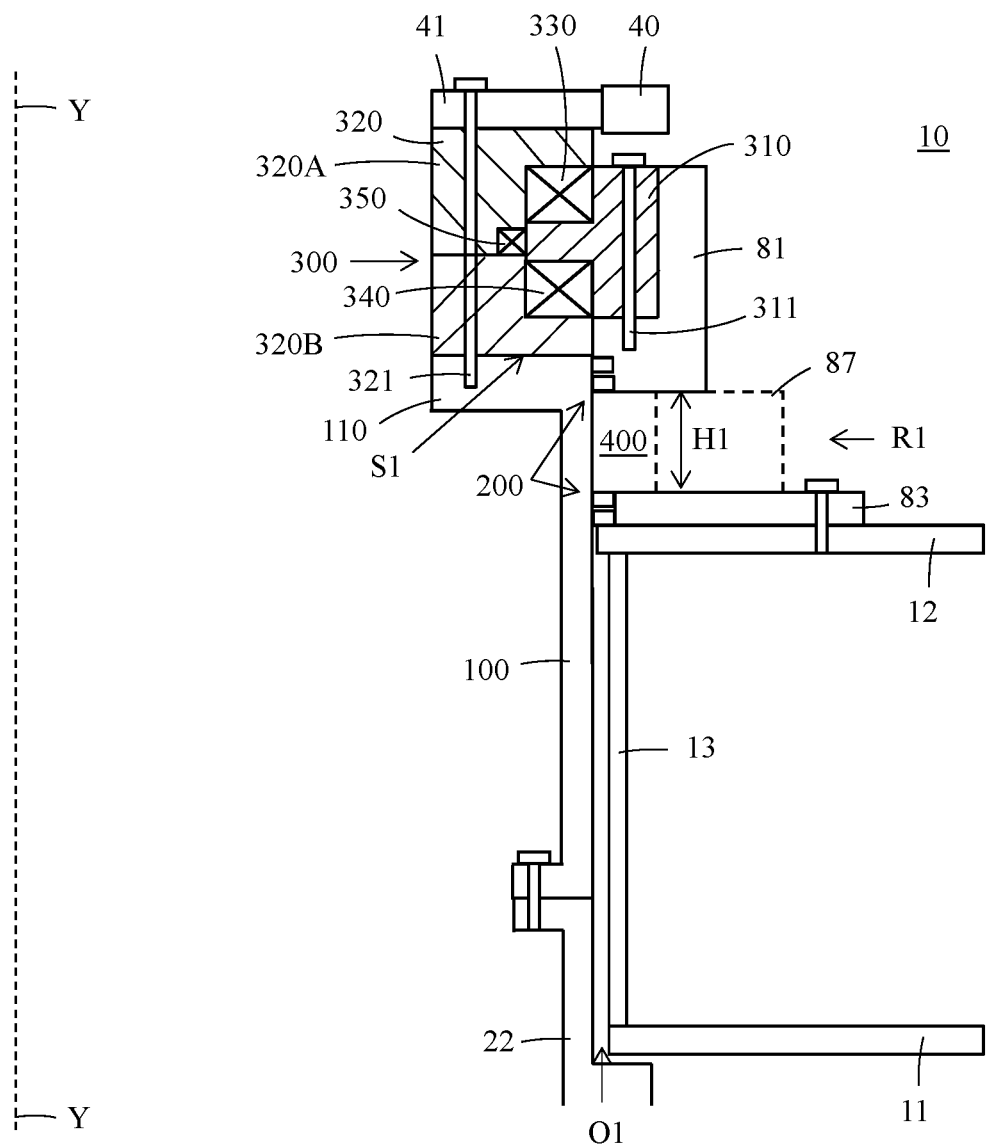
FIG. 2 shows a vertical cross section of a slewing seal arrangement where the invention can be employed.

FIG. 2 shows a vertical cross section of a slewing seal arrangement where the invention can be employed. The cross section shows only the right half of the arrangement, which is symmetrical in view of the centre axis Y-Y of rotation. The stewing bearing 300 and the slewing seal 200 are positioned above the second inner bottom 12 of the vessel 10. The lower surface S1 of the slewing bearing 300 is positioned above the second inner bottom 12 of the vessel 10. The slewing bearing 300 is thus surrounded by the air in the interior of the vessel 10. The air temperature in the interior of the vessel 10 is rather constant, which means that the slewing bearing 300 is subjected to less thermal stresses. The change of the, slewing seal 200 is in this arrangement easy.

The slewing bearing 300 comprises a first bearing block 310, a second bearing block 320, first roller means 330, second roller means 340 and third roller means 350 positioned in raceways between the bearings blocks 310, 320.

The first bearing block 310 is attached with vertically extending bolts 311 to a stationary cylindrical first support part 81. The first support part 81 is supported on the second inner bottom 12 of the vessel 10 with radially and vertically extending support flanges 87 positioned between the first support part 81 and the first support ring 83. The first support ring 83 is attached to the upper surface of the second inner bottom 12 of the vessel 10. The first support part 81 is thus supported only on the second inner bottom 12 of the vessel 10 through the support flanges 87. The first support part 81 is positioned entirely above the second inner bottom 12 of the vessel 10.

The second bearing block 320 is a cylindrical part comprising an upper part 320A and a lower part 320B. The second bearing block 320 is attached with vertically through the upper part 320A and the lower part 320B extending bolts 321 to a vertically extending cylindrical rotating second support part 110, which is formed of the upper portion of the upper block 100. The upper end 22 of the strut 21 of the propulsion unit 20 is attached to the lower end of the upper block 100.

Any standard roller or gliding bearing 300 being lubricated with a lubrication medium could be used here. The lubrication medium could be e.g. oil or grease. The slewing bearing 300 must not be in contact with sea water.

A first support wall 13 extends vertically between the first outer bottom 11 and the second inner bottom 12 of the vessel 10. The first support wall 13 is advantageously cylindrical forming the inner circumference of the first opening O1 between the first outer bottom 11 and the second inner bottom 12.

An inner portion 41 of the gearwheel 40 rests on the second bearing block 320. The inner portion 41 of the gearwheel 40 is attached with vertically extending bolts 321 to the second support part 110. The vertically extending bolts 321 extend also through the second bearing block 320. The rotation of the gearwheel 40 rotates the upper block 100 and the propulsion unit 20 around the centre axis Y-Y.

Figure 3:
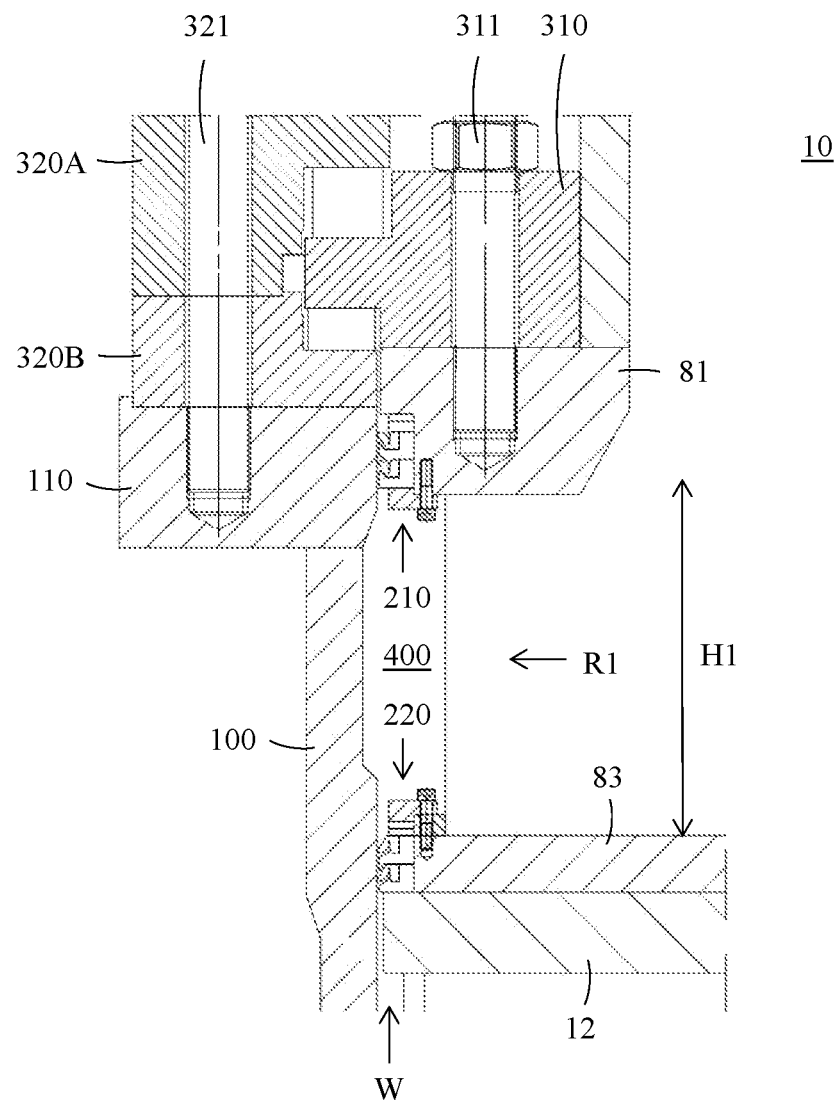
FIG. 3 shows a vertical cross section of an enlargement of the slewing seal arrangement in FIG. 2.

FIG. 3 shows an enlargement of the slewing seal arrangement in FIG. 2. The slewing seal 200 comprises an upper slewing seal 210 and a lower slewing seal 220. The upper slewing seal 210 prevents oil leakage from the slewing bearing 300 to the sea. The lower slewing seal 220 prevents sea water from penetrating into the vessel 10.

The upper slewing seal 210 comprises two seal rings and an end ring. Each seal ring comprises a seal support part of metal and a seal of rubber. The seal of rubber comprises a base part being supported in the seal support part and a lip part acting on the rotating part 100. The upper slewing seal 210 is seated in a recess formed in the first support part 81. There is further a bracket securing the upper slewing seal 210 into the recess. The bracket can be attached e.g. with a bolt to the lower surface of the first support part 81. The upper slewing seal 210 can be changed by removing the bracket and pulling the parts of the upper slewing seal 210 downwards out from the recess.

The lower slewing seal 220 comprises two seal rings. Each seal ring comprises a seal ring support of metal and a seal of rubber. The seal of rubber comprises a base part attached to the seal support part and a lip part acting on the rotating part 100. The lower slewing seal 220 is seated in a recess formed in connection with the inner edge of the first support ring 83. There is further a bracket securing the lower slewing seal 210 into the recess. The bracket can be attached e.g. with a bolt to the upper surface of the first support ring 83. The lower slewing seal 220 can be changed by removing the bracket and pulling the parts of the lower slewing seal 220 upwards out from the recess. The lower slewing seal 220 eliminates water W from penetrating into the hull of the vessel 10.

There is a space 400 between the upper slewing seal 210 and the lower slewing seal 220 in FIG. 3. The height H1 of the space 400 is at least 100 mm, advantageously at least 200 mm, more advantageously at least 300 mm. The height H1 is measured between the lower surface of the lowermost seal ring 211 in the upper slewing seal 210 and the upper surface of the uppermost seal ring 221 in the lower slewing seal 220. There is also access provided to this space 400 in a radial direction R1 from the interior of the hull of the vessel 10. The access is through the passages formed between the radially and vertically extending support flanges 87. It is possible to service the upper slewing seal 210 and the lower slewing seal 220 via this space 400. The space 400 between the upper slewing seal 210 and the lower slewing seal 220 is advantageously an open space.

Figure 4:
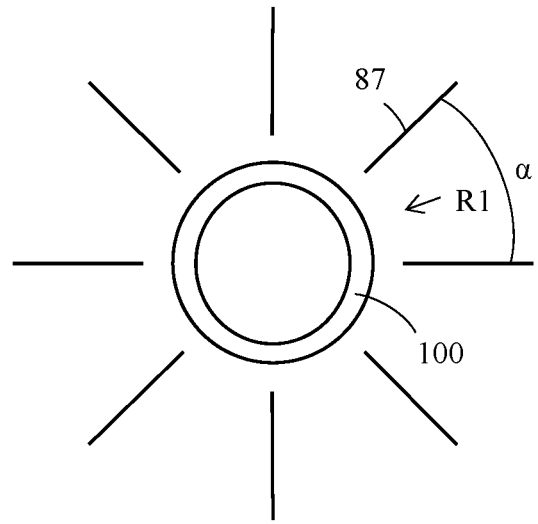
FIG. 4 shows a first horizontal cross section of the arrangement in FIG. 2.

FIG. 4 shows a first horizontal cross section of the arrangement in FIG. 2. The horizontal cross section is from a level between the upper slewing seal 210 and the lower slewing seal 220. The figure shows the radially and vertically extending support flanges 87 between the first support part 81 and the first support ring 83. The inner ends of the support flanges 87 are positioned at a radial distance from the rotating part 100. The support flanges 87 are positioned at an angular distance a from each other. There has to be enough space between two adjacent support flanges 87 so that the change of the upper slewing seal 210 and the lower slewing seal 220 can be done.

Figure 5:
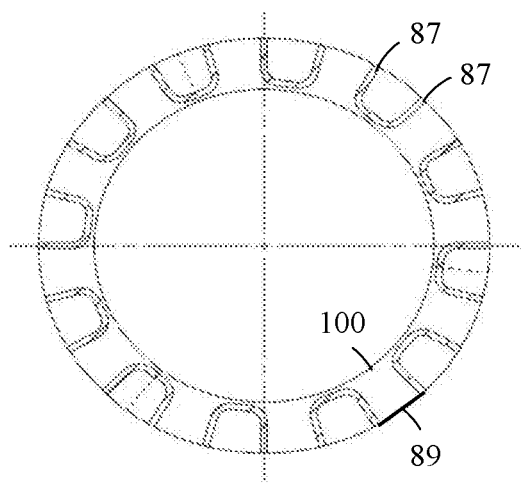
FIG. 5 shows a horizontal cross section of an alternative of FIG. 2.

FIG. 5 shows a horizontal cross section of an alternative of FIG. 2. This figure shows an alternative support arrangement between the slewing bearing 300 and the second inner bottom 12 of the vessel. The vertically and radially extending support flanges 87 are grouped into groups of two and the inner ends of each end are connected as shown in the figure. Access to the upper block 100 is still provided between two adjacent support flanges 87 that are not connected at their inner ends. Each group of two support flanges 87 have a U-shaped form as is seen from the figure. The figure shows also a hatch 89 between two adjacent support flanges 87. Hatches 89 can be used between all openings formed between two adjacent support flanges 87 in order to close said space. The hatches 89 provide on the other hand access to said space if needed.

Figure 6:
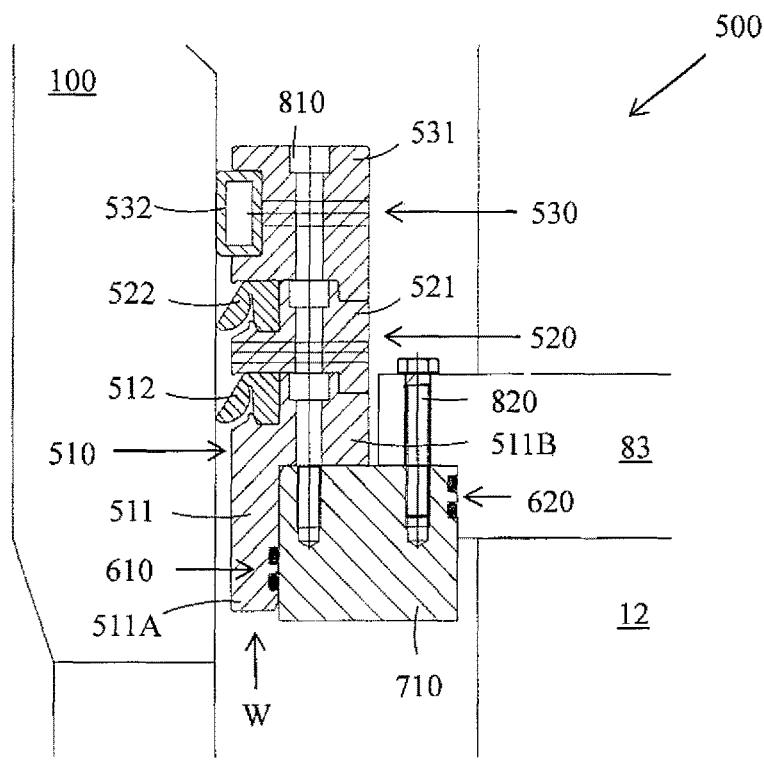
FIG. 6 shows a first embodiment of the inventive arrangement applied to a slewing seal.

FIG. 6 shows a first embodiment of the inventive arrangement applied to a slewing seal. The inventive arrangement can be applied e.g. to the lower slewing seal 220 i.e. the water seal shown in FIG. 3. The seal 500 comprises a pack of annular seal rings 510, 520, 530. There is a first seal ring 510, a second seal ring 520 and an emergency seal ring 530. The first seal ring 510 and the second seal ring 520 comprises a rubber seal part 512, 522 being supported within a seal support part 511, 521 of metal. The rubber seal part 511, 521 comprises a base part being supported in the seal support part 511, 521 and a lip part forming the seal surface against the rotating part 100. The emergency seal ring 530 comprises an inflatable rubber seal 532 being supported within a seal support part 531 of metal. The seal rings 510, 520, 530 are attached with bolts 810 passing through the seal 500 to a second support ring 710. The second support ring 710 is attached with bolts 820 passing through the first support ring 83 to a lower surface of the first support ring 83. The seal support part 511 in the first seal ring 510 has the form of cylinder 511A provided with an annular flange 511B at the upper end of the cylinder 511A. The annular flange 511B of the seal support part 511 is supported directly on an upper surface of the second support ring 710 forming a support structure. The outer surface of the cylinder 511A of the seal support part 511 is supported on the inner cylindrical surface of the second support ring 710. The inner cylindrical surface of the second support ring 710 forms the inner circumference of the first opening O1. There is a first auxiliary seal comprising two O-rings 610 sealing the cylinder 511A of the seal support part 511 against the inner surface of the second support ring 710. There is a second auxiliary seal comprising two O-rings 620 between an outer cylindrical surface of the second support ring 710 and an inner cylindrical surface of the first support ring 83. The seal 500 can be mounted into place from below. The package of seal rings 510, 520, 530 is assembled and attached to the second support ring 710 with the bolts 810 passing through the water seal 500. The whole package of seal rings 510, 520, 530 is then lifted from below in position and attached to the lower surface of the second support ring 83 with bolts 820 passing through the second support ring 83. The inner circumference of the cylinder 511A of the seal support part 511 of the first seal ring 510 is at a distance from the outer surface of the rotating part 100.

Figure 7:
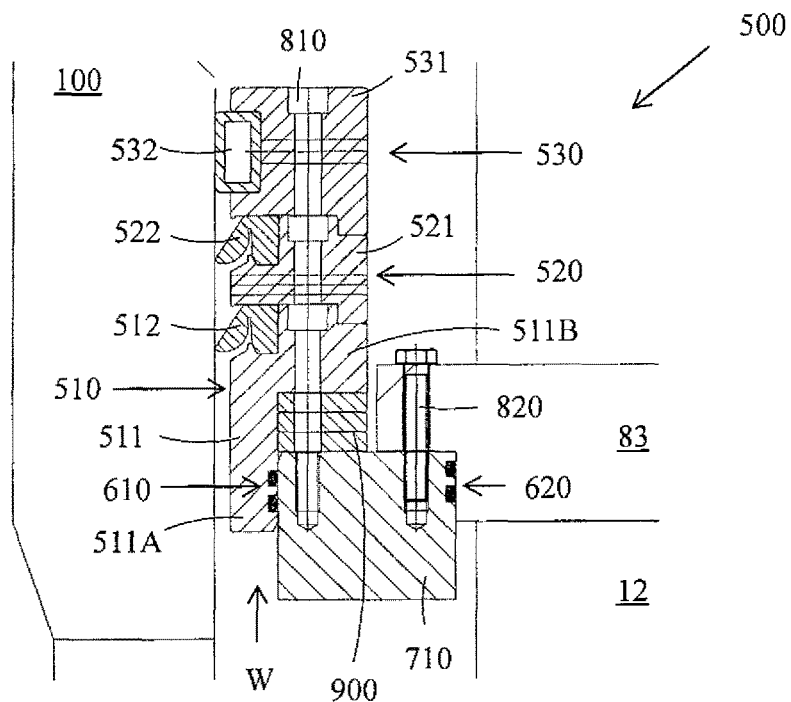
FIG. 7 shows the water seal of FIG. 6 in a different position.

FIG. 7 shows the water seal of FIG. 6 in a different position. The difference compared to FIG. 6 is that three spacer rings 900 have been positioned between the annular flange 511B of the seal support part 511 in the first seal ring 510 and the horizontal upper surface of the second support ring 710. The spacer rings 900 form adjusting means that raise the seal 500 in the vertical direction upwards, which means that the position of the lip parts of the rubber seal parts 512, 522 will be changed. The lip parts of the rubber seal parts 512, 522 will now be acting on a fresh surface of the cylindrical rotating part 100. The spacer rings 900 can be composed of sectors of a ring or of small rectangular or circular spacer parts, which can be inserted along the circumference of the first seal ring 510. The figure shows three spacer rings 900 that can be inserted one at a time. The vertical position of the seal 500 can be changed at three timely different occasions by inserting one spacer ring 900 at each occasion. The spacer rings 900 need not be sealed in any way as the O-rings 610 prevent sea water from penetrating to the space where the spacer rings 900 are. The annular flange 511B of the support part 511 of the first seal ring 510 is indirectly supported on the second support ring 81 through the spacer rings 900.

Figure 8:
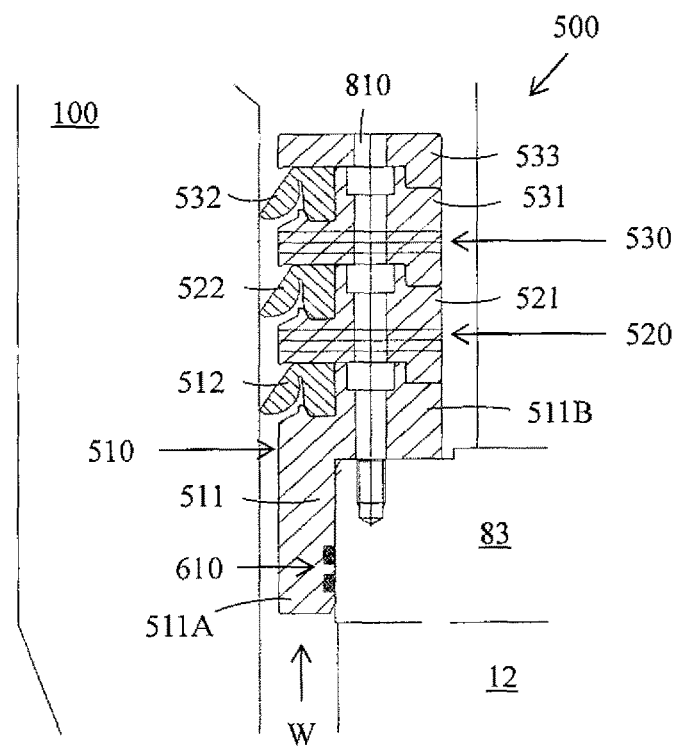
FIG. 8 shows a second embodiment of the inventive arrangement applied to a slewing seal.

FIG. 8 shows a second embodiment of the arrangement according to the invention applied to a slewing seal. The installation of the water seal 500 is in this embodiment from above. There is thus no second support ring 710 needed in this embodiment. The first seal ring 510 is supported directly on an upper horizontal surface of the first support ring 83. The seal 500 is thus fastened with bolts 810 passing through the water seal 500 directly to the first support ring 83. The construction of the seal 500 corresponds in all other respects to the seal shown in the first embodiment. The annular flange 511B of the seal support part 511 of the first seal ring 510 is supported directly on the upper horizontal surface of the first support ring 83. The first support ring 83 forms a support structure. There are two first auxiliary seals in the form of O-rings 610 sealing the cylinder 511A of the seal support part 511 of the first seal ring 510 against the inner circumference of the first support ring 83. The inner circumference of the first support ring 83 forms the first opening O1. The inner circumference of the cylinder 511A of the seal support part 511 of the first seal ring 510 is at a distance from the outer surface of the rotating part 100.

Figure 9:
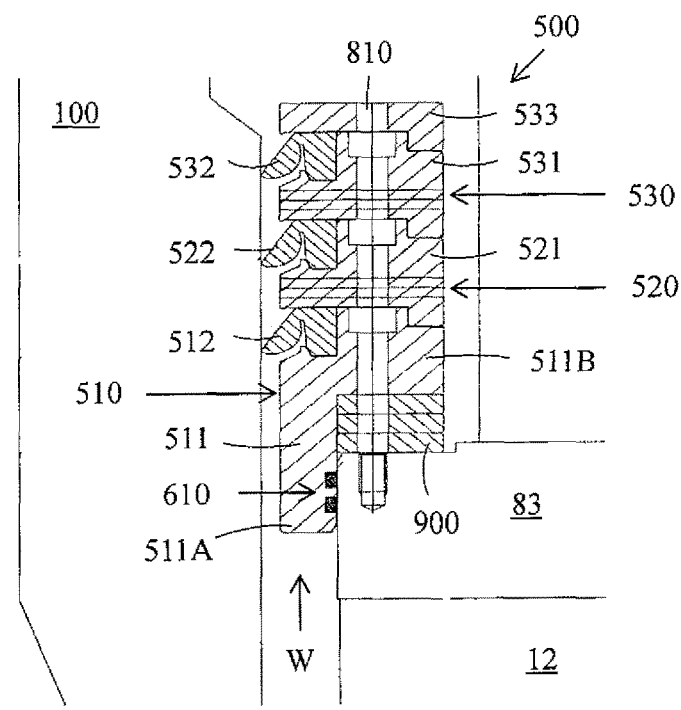
FIG. 9 shows the water seal of FIG. 8 in a different position.

FIG. 9 shows the water seal of FIG. 8 in a different position. The figure shows again three spacer rings 900 positioned between the annular flange 511B of the seal support part 511 of the first seal ring 510 and the upper horizontal surface of the first support ring 83. The construction of the spacer rings 900 can correspond to that of the spacer rings 900 in the first embodiment. The seal 500 can be raised e.g. by jacks positioned around the circumference of the water seal 500. Horizontal support arms could be attached to upper end of the seal 500. The jacks could then be positioned between the horizontal support arms and the first support ring 83 in order to raise the seal 500. The spacer rings 900 could then be positioned between the lower surface of the annular flange 511B of the seal support part 511 of the first seal ring 510 and the upper horizontal surface of the first support ring 83.

Figure 10:
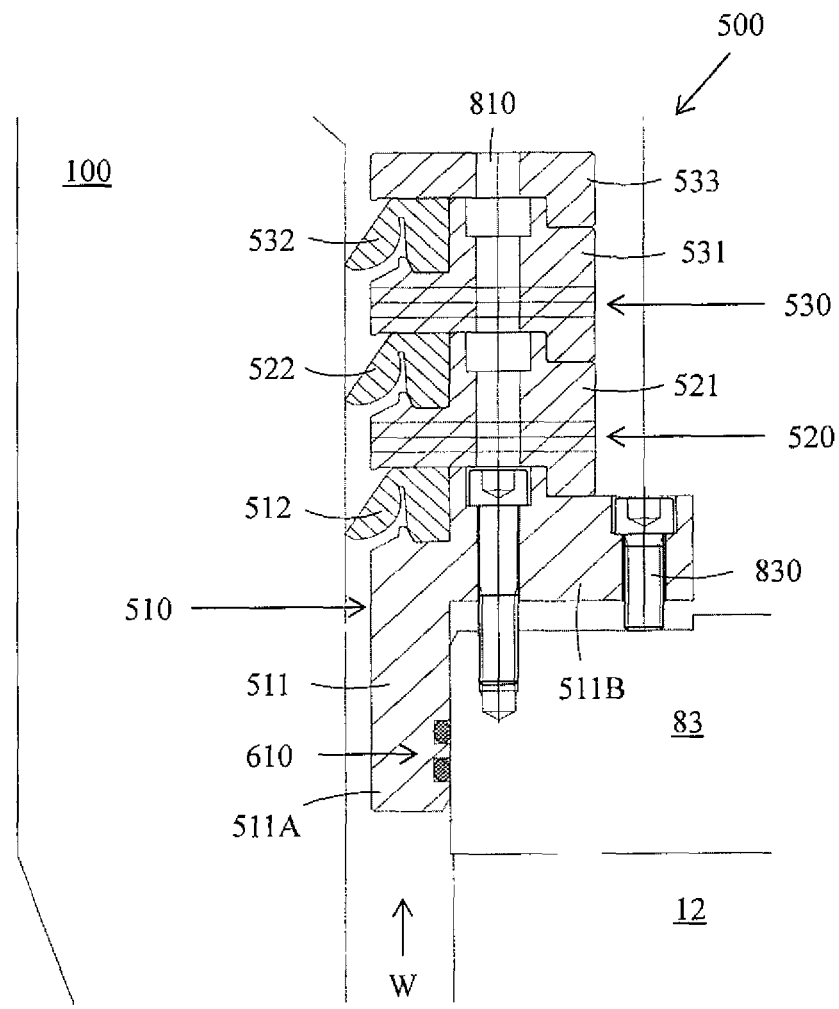
FIG. 10 shows a third embodiment of the inventive arrangement applied to a slewing seal.

FIG. 10 shows a third embodiment of the arrangement according to the invention applied to a slewing seal. This third embodiment differs from the second embodiment in that the use of spacer rings 900 have been substituted by the use of adjuster bolts 830. The annular flange 511B of the seal support part 511 of the first seal ring 510 is larger so that there is space for adjuster bolts 830 to pass through the annular flange 511B of the seal support part 511 of the first seal ring 510 outside the circumference of the seal 500. The end of the adjuster bolts 830 are supported on the upper surface of the second support ring 83. There could be different sets of adjuster bolts 830 so that each set has a specific length. Each specific set of adjuster bolts 830 could then be used to position the seal 500 in a desired axial position in relation to the rotation part 100. The adjuster bolts 830 form adjusting means. The adjuster bolts 830 could as an alternative solution extend upwards i.e. through the second support ring 83. Such a solution could be used in situations where there is not space for the bolts on the side of part 83 where the flange 511B is, but there is instead space for the adjuster bolts on the opposite side of part 83.

Figure 11:
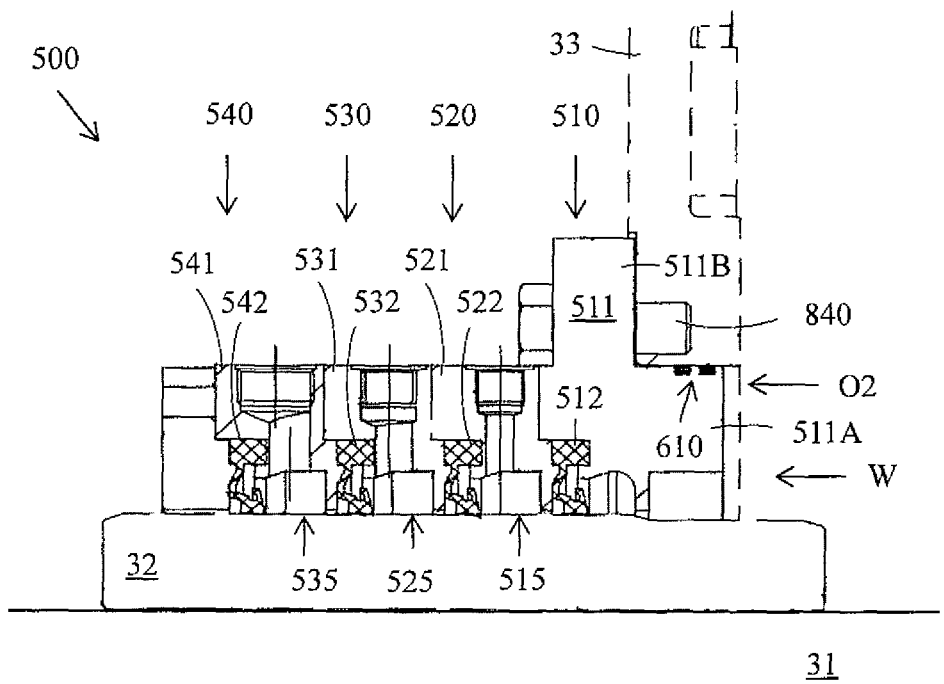
FIG. 11 shows a fourth embodiment of the inventive arrangement applied to a shaft seal.

FIG. 11 shows a fourth embodiment of the arrangement according to the invention applied to a shaft seal. The figure shows a seal 500 comprising four seal rings 510, 520, 530, 540 and three seal chambers 515, 525, 535. The rubber seal parts 512, 522, 532, 542 comprise each a lip portion and a support portion being supported in seal support parts 511, 521, 531, 541 of metal. There is a liner 32 on the shaft 31 and the lip portions of the rubber seal parts 512, 522, 532, 542 are thus acting on the outer surface of the liner 32. The seal support part 511 in the first seal ring 510 has the form of a cylinder 511A provided with an annular flange 511B at one end of the cylinder 511A. The annular flange 511B of the seal support part 511 of the first seal ring 510 seats against the end wall 33 surrounding the second opening O2 in said end wall 33 in the lower compartment 23 of the strut 21. The cylinder 511A of the seal support part 511 of the first seal ring 510 seats against an inner circumference of the second opening O2 in the end wall 33 of the lower compartment 23 of the strut 21. There are two auxiliary seals in the form of O-rings 610 sealing the cylinder 511A of the seal support part 511 of the first seal ring 510 against the inner circumference of the second opening O2 in the end wall 33 of the lower compartment 23 of the strut 21. The end wall 33 forms a support structure.

Figure 12:
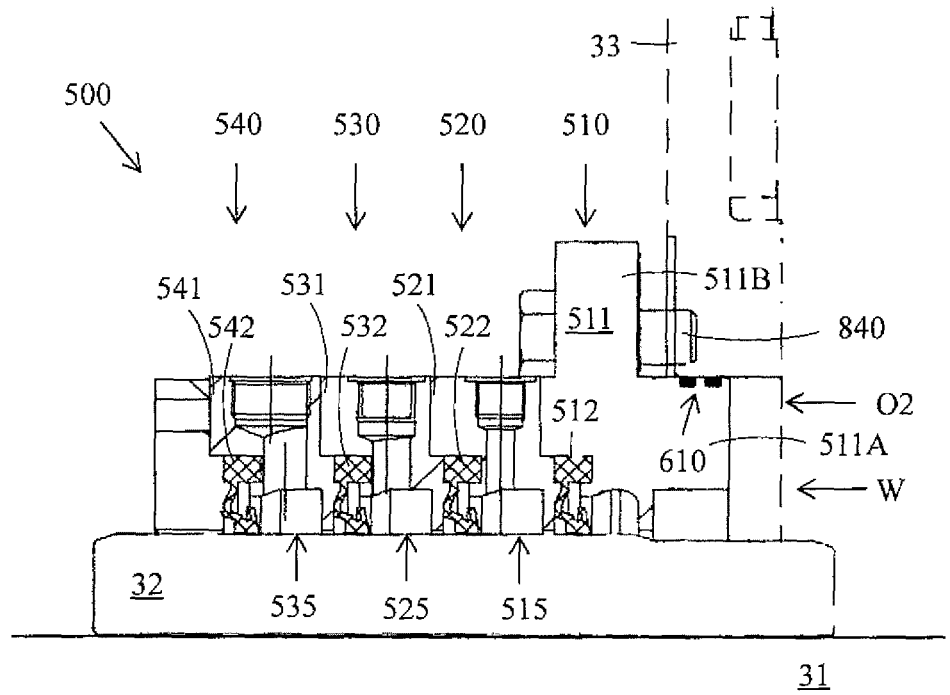
FIG. 12 shows the water seal of FIG. 11 in a different position.

FIG. 12 shows the water seal of FIG. 11 in a different position. The figure shows that the seal 500 has been moved to the left in the figure. There is thus a space between the annular flange 511B of the seal support part 511 of the first seal ring 510 and the end wall 33 of the lower compartment 23 of the strut 21. The movement can be achieved by using spacer rings 900 as in the first and the second embodiment or be using adjuster bolts 840 as in the third embodiment. The principal of the inventive arrangement relating to the relocation of the seal 500 is the same in a slewing seal and in a shaft seal.

The inventive seal 500 is in FIGS. 6-10 shown in connection with the lower slewing seal 220 i.e. the water seal shown in FIG. 3. The same principal could naturally be used in connection with the upper slewing seal 210 i.e. the slewing seal in FIG. 3. The upper slewing seal 210 prevents leakage of oil or grease from the slewing bearing 300 to the sea.

The inventive seal arrangement can be used to seal against any medium that has to be sealed. The medium that the seal seals against could thus be e.g. water, oil, grease etc.

The seal 500 according to the invention comprises at least two seal rings 510, 520, 530. The seal 500 according to the invention could in principle comprise only one seal ring i.e. only the seal ring 510 closest to the medium, but it seems that at least two seal rings are needed in practical solutions. The first auxiliary seal 610 and the second auxiliary seal 620 comprise each two O-seals in the figures. The auxiliary seals 610, 620 are naturally not limited to this seal construction, but any prior known seal construction could be used here.

The arrangement is not limited to the propulsion unit shown in the figures. The arrangement can naturally be used also in connection with e.g. a mechanical drive unit. The motor could thus be positioned in the interior of the vessel, whereby the propeller would be connected to the motor by a horizontal and a vertical shaft. A slip ring unit would not be needed in such a case.

The strut 21 could naturally be turned by one or more hydraulic motors instead of one or more electric motors. The turning angle of the strut 21 could naturally be less than 360 degrees.

The invention and its embodiments are not limited to the examples described above but may vary within the scope of the claims.

The invention claimed is:
1. A seal arrangement in a vessel, said seal arrangement comprising a seal sealing a cylindrical rotating part passing through an opening in a support structure in the vessel against a medium, the cylindrical rotating part comprising an upper portion and a lower portion, an upper end portion of the upper portion passing through the opening in a bottom of the vessel, said upper end portion of the upper portion being rotatably attached to the vessel with the seal in the opening, said seal comprising a stack of annular seal rings, each seal ring comprising a seal part and a seal support part, the seal part acting on the upper end portion and being supported in the seal support part wherein the seal support part in a first seal ring positioned closest to the medium has the form of a cylinder provided with an annular flange at one end of the cylinder, whereby an outer circumference of the cylinder is supported and sealed with an auxiliary seal against an inner circumference of the opening and the annular flange is supported against the support structure surrounding the opening, and that there are adjusting means acting between the annular flange and the support structure for adjusting the position of the seal support part in the first seal ring in relation to the support structure surrounding the opening in order to relocate the seal in an axial direction in relation to the rotating part, the seal being attached to an upper surface of a second support ring with bolts passing through the seal into the second support ring which is attached to a lower surface of a first support ring which is attached to the bottom of the vessel, whereby the seal rings in the seal act on the outer surface of the upper end portion and the auxiliary seal in the cylinder of the seal support part of the first seal ring act on an inner circumference of the second support ring.

2. The seal arrangement according to claim 1, wherein the adjusting means comprises spacer parts arranged to be inserted between the annular flange of the seal support part of the first seal ring and the support structure surrounding the opening in order to relocate the seal in an axial direction in relation to the rotating part.

3. The seal arrangement according to claim 1, wherein the adjustment means comprises adjuster bolts passing through the annular flange of the seal support part of the first seal ring and the support structure surrounding the opening in order to relocate the seal in an axial direction in relation to the rotating part.

4. The seal arrangement according to claim 1, wherein the seal is a slewing seal and the cylindrical rotating part is a rotating strut of a propulsion unit.

5. The seal arrangement according to claim 4, wherein the rotating strut is a hollow strut.

6. The seal arrangement according to claim 1, the seal is a shaft seal and the cylindrical rotating part is a rotating shaft of a propulsion unit.

7. The seal arrangement according to claim 6, wherein the propulsion unit comprises a hollow strut with an upper portion and a lower portion, the lower portion of the strut forming a longitudinal compartment comprising a first electric motor being connected with the rotating shaft to a propeller outside the lower portion.

8. The seal arrangement according to claim 2, wherein the seal is a slewing seal and the cylindrical rotating part is a rotating strut of a propulsion unit.

9. The seal arrangement according to claim 3, wherein the seal is a slewing seal and the cylindrical rotating part is a rotating strut of a propulsion unit.

10. The seal arrangement according to claim 8, wherein the rotating strut is a hollow strut.

11. The seal arrangement according to claim 9, wherein the rotating strut is a hollow strut.

12. The seal arrangement according to claim 2, wherein the seal is a shaft and the cylindrical rotating part is a rotating shaft of a propulsion unit.

13. The seal arrangement according to claim 3, wherein the seal is a shaft seal and the cylindrical rotating part is a rotating shaft of a propulsion unit.

* * * * *